(12) United States Patent  
Booth

(10) Patent No.: US 8,375,201 B2  
(45) Date of Patent: Feb. 12, 2013

(54) ETHERNET PHY LEVEL SECURITY

(75) Inventor: Bradley John Booth, Austin, TX (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 497 days.

(21) Appl. No.: 12/399,002

(22) Filed: Mar. 5, 2009

(65) Prior Publication Data

US 2010/0228964 A1 Sep. 9, 2010

(51) Int. Cl.
*H04L 29/06* (2006.01)

(52) U.S. Cl. ........................................... 713/151
(58) Field of Classification Search ............... 713/151
See application file for complete search history.

(56) References Cited

U.S. PATENT DOCUMENTS

2003/0161348 A1* 8/2003 Mills et al. .................. 370/509
2007/0240213 A1* 10/2007 Karam et al. ................ 726/22

OTHER PUBLICATIONS

IEEE 802.3 Clause 37.

* cited by examiner

*Primary Examiner* — Jung Kim
*Assistant Examiner* — Ayoub Alata
(74) *Attorney, Agent, or Firm* — Turocy & Watson, LLP

(57) ABSTRACT

A system and method are provided for securing links at the physical (PHY) layer in an IEEE 802.3 Ethernet communication system. A local device (LD) receives an electrical waveform representing link partner security information from a network-connected link partner (LP) via unformatted message pages. The LD accesses predetermined LP reference information stored in a tangible memory medium. The LD compares the received LP security information to the LP reference information. In response to the LD matching the received LP security information to the LP reference information, a secure link to the LP is verified. Likewise, the LD may send electrical waveforms representing security information to the LP via the unformatted message pages. In response to the LP matching the LD security information to the LD reference information, a secure link to the LD is verified.

16 Claims, 7 Drawing Sheets

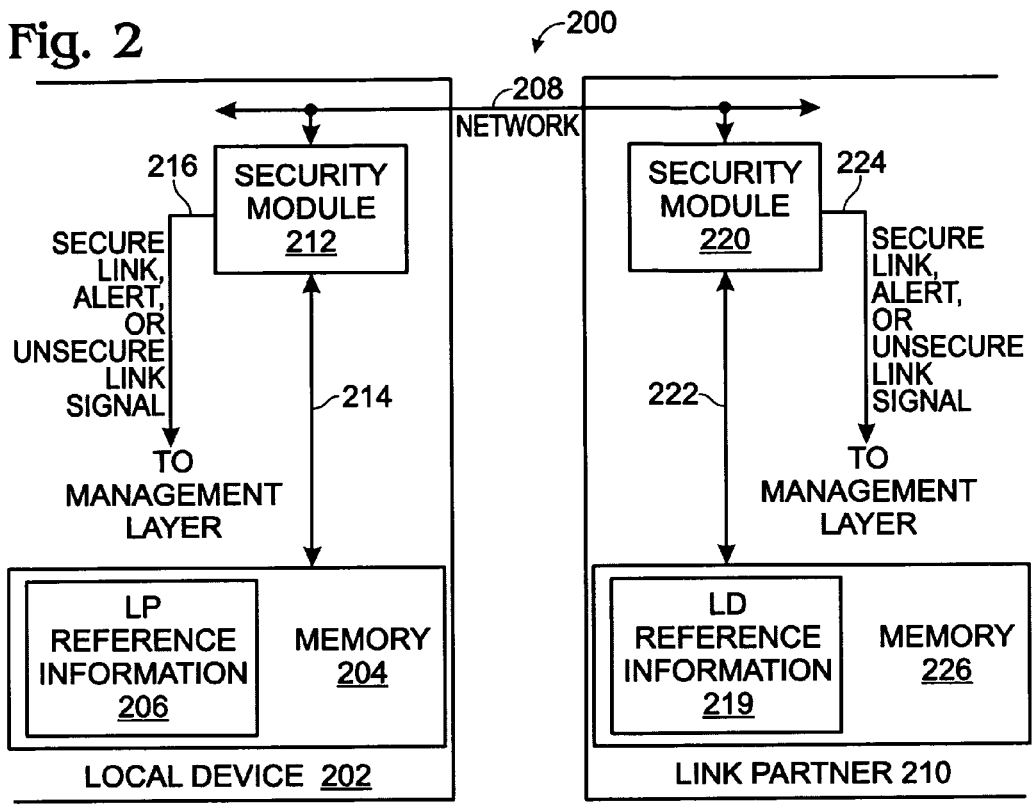
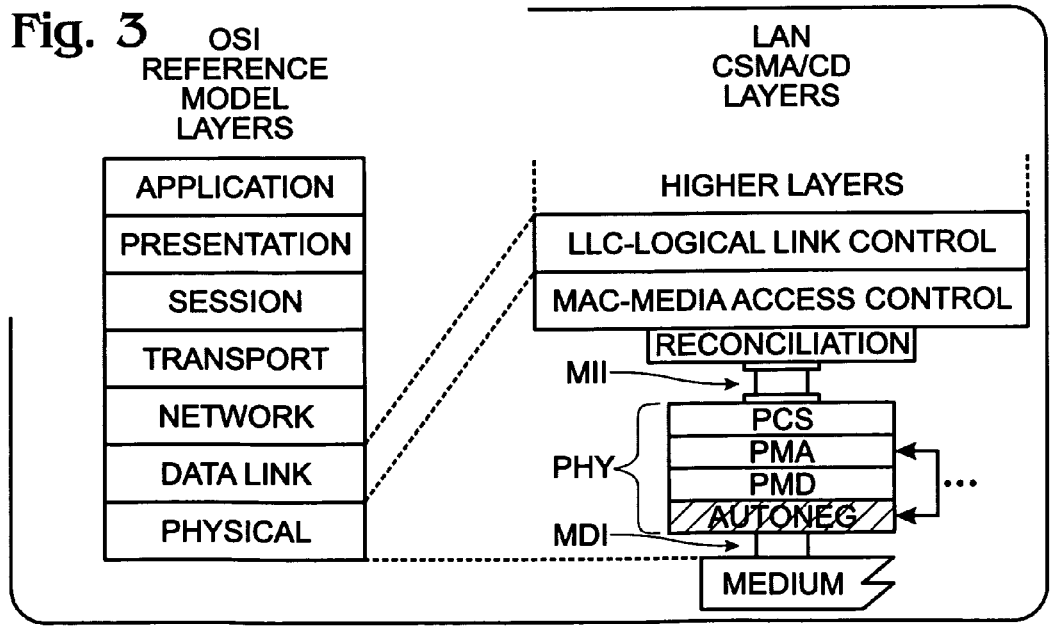

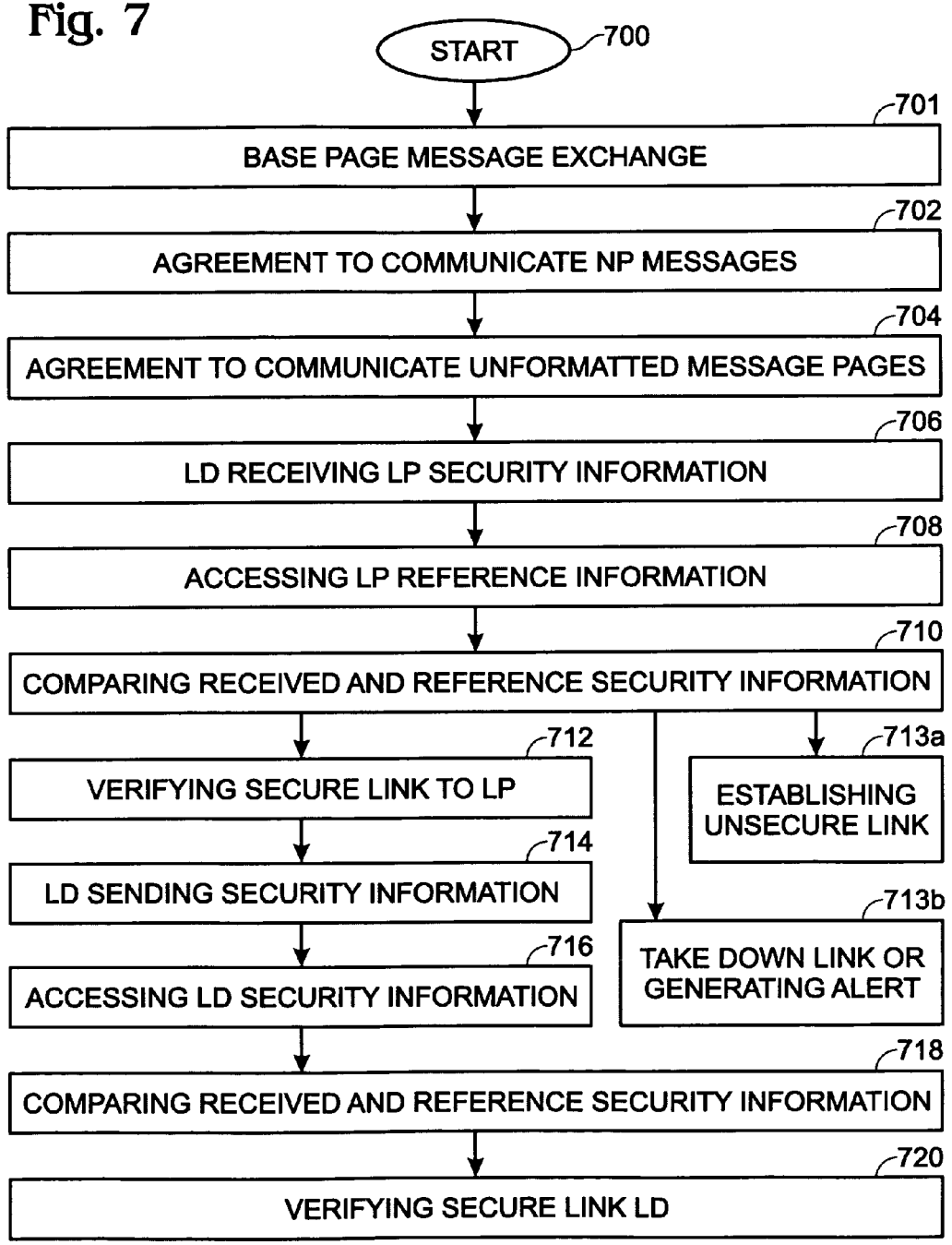

ETHERNET PHY LEVEL SECURITY

BACKGROUND OF THE INVENTION

1. Field of the Invention

This invention generally relates to communication systems and, more particularly, to a system and method for securing a negotiated link communication system at the physical (PHY) level.

2. Description of the Related Art

IEEE 802.3 auto-negotiation (AN), as described in Clauses 28, 37, 40, and 73, is a set of protocols which permit compatible PHY devices to communicate a preferred state of operation. The AN protocols described in IEEE 802.3 communicate operational information such as speed of operation, full or half duplex mode, master/slave relationship, etc.

While it is possible to protect against unauthorized usage and access at higher layer's (in the OSI reference model), it would be advantageous if AN-capable links could be made secure at the PHY level.

SUMMARY OF THE INVENTION

The invention disclosed herein permits Ethernet physical layer (PHY) devices to exchange security or identification information during auto-negotiation (AN) Next Page (NP) exchanges, to provide a secure connection prior to initiation of a connection and the use of upper layer protocols. The security information used to setup a secure connection may be either public or proprietary. For example, an identification information such as manufacturer, model number, equipment identification code, or version information may be used as the security information.

With Ethernet protocols being used in more and more applications, the need to exchange identification or security information at the lower layers is becoming more critical. As is conventional, AN pages are sent to, and received by compliant link partners. Through these AN pages the rate and, potentially, other features such as FEC and pause control may be negotiated. The invention permits a low level identification of a security-enabled device or even the exchange of preferred security settings using AN pages. This invention also permits PHYs to exchange proprietary information related to identification to ensure compatible equipment usage or intrusion detection.

Accordingly, in an IEEE 802.3 Ethernet communication system, a method is provided for securing links at the PHY layer. A local device (LD) receives an electrical waveform representing link partner security information from a network-connected link partner (LP) via unformatted message pages. The LD accesses predetermined LP reference information stored in a tangible memory medium. The LD compares the received LP security information to the LP reference information. In response to the LD matching the received LP security information to the LP reference information, a secure link to the LP is verified.

Likewise, the LD may send electrical waveforms representing security information to the LP via the unformatted message pages. The LP accesses predetermined LD reference information in a tangible memory medium, and compares the LD security information to the LD reference information. In response to the LP matching the LD security information to the LD reference information, a secure link to the LD is verified. For example, the received security information may be a proprietary code or a device identification.

Additional details of the above-described method and, a system for securing links at the PITY layer in an IEEE 802.3 Ethernet communication network, are provided below.

BRIEF DESCRIPTION OF THE DRAWINGS

FIG. 2 is a schematic block diagram of a system for securing links at the physical (PHY) layer in an IEEE 802.3 Ethernet communication network.

FIG. 3 is a schematic diagram illustrating the PHY layer for backplanes and twisted-pair cabling.

FIG. 7 is a flowchart illustrating a method for securing links at the PHY layer in an IEEE 802.3 Ethernet communication system.

DETAILED DESCRIPTION

Figure 1:
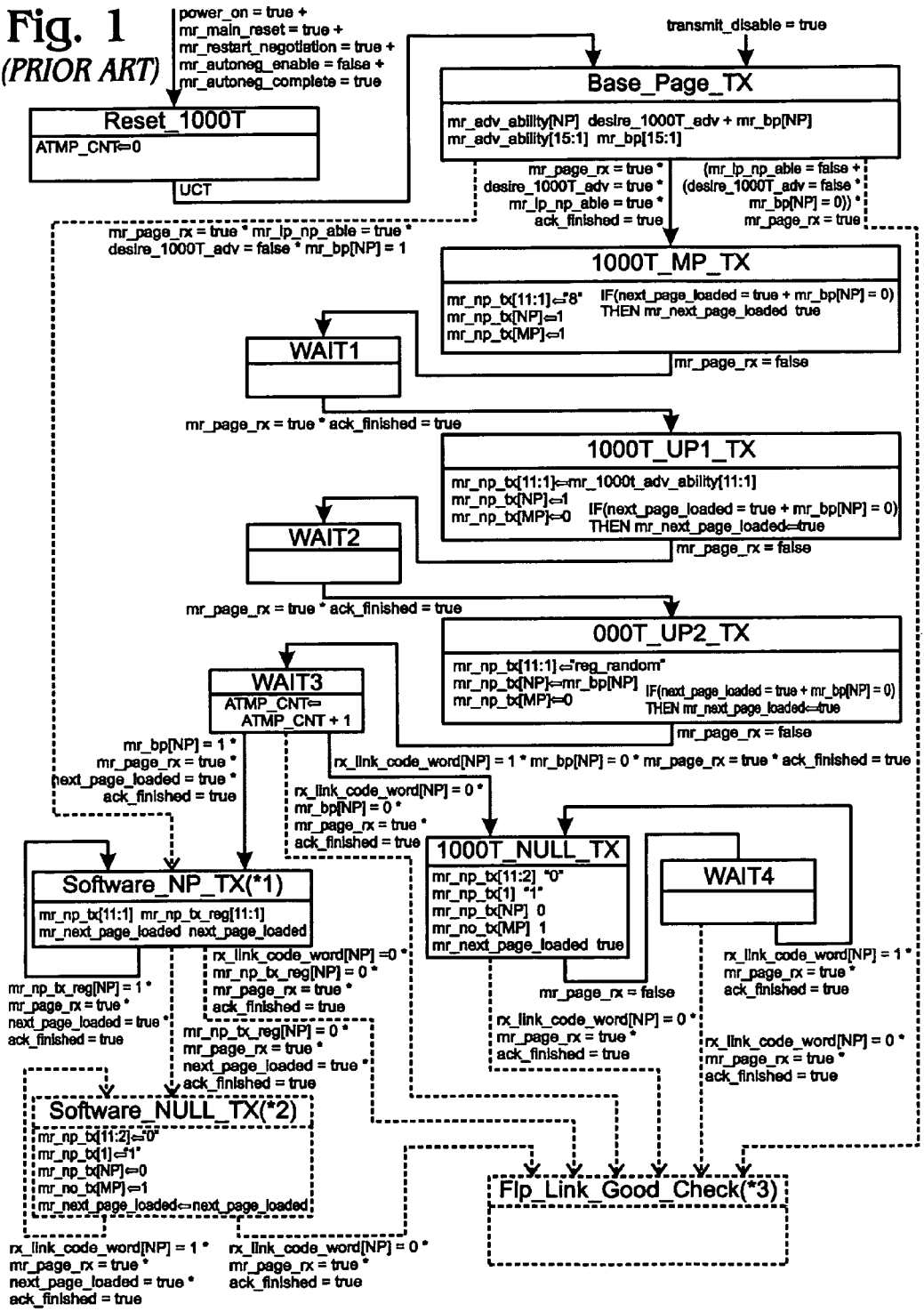
FIG. 1 depicts FIG. 40C-2 of IEEE 802.3 (prior art).

FIG. 2 is a schematic block diagram of a system for securing links at the physical (PHY) layer in an IEEE 802.3 Ethernet communication network. The system 200 comprises a local device (LD) 202. The LD 202 includes a memory 204 having stored therein predetermined link partner (LP) reference information 206. The LD 202 has a network interface on line 208 for receiving security information from a network-connected LP 210 via unformatted message pages. For example, communications may be in accordance with either an IEEE 802.3ap Clause 73 protocol or an 802.3 Clause 37 protocol. A security module 212 has an interface on line 208 for accepting the LP security information and an interface on line 214 for accessing the LP reference information stored in memory 204.

The security module 212 compares the LP security information to the LP reference information, and supplies a secure link signal on line 216 in response to matching the LP security information to the LP reference information. If the LD security module is unsuccessful in matching the LP security information to the LP reference information, the LD security module takes down the link on line 208, generates an alert on line 216, or both.

In one aspect the LD security module 212, prior to receiving the LP security information, transmits a message via the network interface on line 208 agreeing to communicate Next Page (NP) messages with the LP 210, and agreeing to communicate unformatted message pages with the LP 210. If the LP 210 fails to agree to exchange security information with the LD 202, the LD security module supplies a signal on line 216 indicating the establishment of an unsecured link with the LP.

While it is possible for link partners to agree in the establishment of a two-way link where only one direction is secured, typically both directions are secured. Then, the LD security module 212 sends security information to the LP 210 via the network interface on line 208 using unformatted message pages. The LP 210 includes a memory 226 having stored therein predetermined LD reference information 219. The LP network interface on line 208 receives security information from the network-connected LD 202 via unformatted message pages. An LP security module 220 has an interface on line 208 for accepting the LD security information and an interface on line 222 for accessing the LD reference information stored in memory 226. The LP security module 220 compares the LD security information to the LD reference information, and supplies a secure link signal on line 224 in response to matching the LD security information to the LD reference information.

The LP (or LD) security information may be a proprietary code or some kind of device identification, such as a manufacturer, model number, or serial number. In one aspect, the LD security module 212 receives a proprietary code as a predetermined bit sequence in a first unformatted message page, and receives a key in subsequent unformatted message pages. Then, the LD security module 212 compares LP security information to LP reference information by generating a code using the key, and comparing the code to the LP reference information.

In another aspect, as a preliminary step, the LD security module 212 may agree to communicate NP messages with the LP by sending an unformatted message page via the network interface 208, indicating that a secure link is required. In that case, the LD security module 212 must receive an unformatted message page from the LP 210 acknowledging the initiation of a secure link procedure. For example, the LD security module 212 may send an unformatted message page with a Message Page (MP) bit set to a logic zero, and receive an unformatted message page from the LP 210 with the MP bit set to a logic zero. In another variation, the LD security module 212 may exchange base page messages with the LP 210 via the network interface 208, prior to agreeing to communicate NP messages.

Although they are not shown, the LP and LD include transceiver equipment to enable communications via the network 208. Typically, the security modules are enabled as state machine logic hardware. However, it would also be possible to enable the security modules as software instructions stored in a memory that are executed by a processor.

Functional Description

The system described in FIG. 2 exchanges security or ID information using Ethernet's auto-negotiation process. The system provides lower level exchange of security or ID information, which can also be used for higher level security cross-referencing.

FIG. 3 is a schematic diagram illustrating the PHY layer for backplanes and twisted-pair cabling. Auto-negotiation is used to determine the parameters of the link, which occurs prior to any training sequences or the establishment of a link capable of carrying data. Auto-negotiation for twisted-pair wires is specified in Clause 28, with Clause 40 being relevant for 1000BASE-T. Auto-negotiation for 1000BASE-X optical and coax cabling is specified in Clause 37. Auto-negotiation for backplanes is specified in Clause 73.

Figure 4:
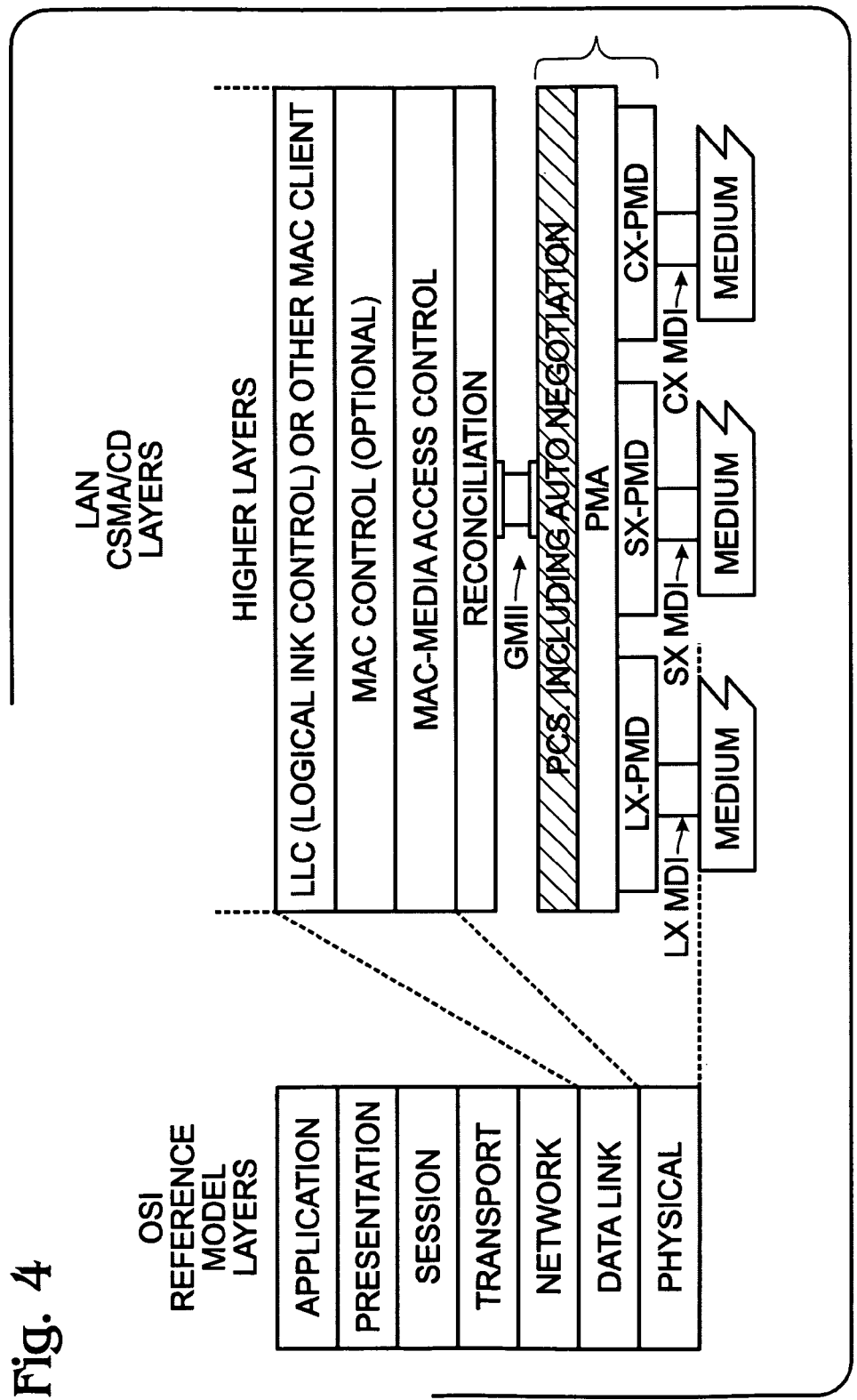
FIG. 4 is a schematic diagram illustrating the PITY layer for 1000BASE-X.

FIG. 4 is a schematic diagram illustrating the PHY layer for 1000BASE-X. 1000BASE-X performs the auto-negotiation after the serializer/deserializer (SERDES) are running. Auto-negotiation must be preformed prior to the link being established, as specified in Clause 37 (802.3).

A local device (LD) and link partner (LP) initiate an exchange during the base page transmission. For the exchange to occur, both the LD and LP must indicate a Next Page (NP) messages are to follow by setting the NP bit to logic one in the base page. This is defined in IEEE 802.3 Clauses 28, 37 and 73.

In some cases, NP messages are required to bring-up the PHY device. These messages are defined in IEEE 802.3. If the message page (MP) bit is set to logic one, then pre-defined message pages are transmitted. For the security or identification exchange, the LD and LP must complete their base page and message page exchange, and then the devices can exchange unformatted message pages. This may be indicated by setting the MP bit to logic zero.

Once the LD and LP devices enter into transmission of unformatted message pages, they can exchange pre-defined and proprietary information related to security or identification. For example, the LD can transmit a pre-defined 11-bit code such as 0b11001010111 to indicate that the next 3 unformatted message pages will contain a 33-bit security generation key. The key would be unique that transmission and result in a unique security encryption code.

FIG. 1 depicts FIG. 40C-2 of IEEE 802.3 (prior art). Per this figure, a 1000BASE-T device can transmit its base page and a message page followed by two unformatted message pages to complete the auto-negotiation function required to bring up the link. If the LD has no security or identification information to exchange, it transmits a Null page and auto-negotiation completes. If a security or identification exchange is required, the LD indicates to the LP that it has another unformatted page. The unformatted message indicates to the LD and LP that the next series of exchanges has specific information. If the LP does not recognize the LD's unformatted message, it provides an incorrect response and the LD indicates to management that the link cannot be secured. If the LP recognizes the message and responds correctly, then the next unformatted page transmission would contain the agreed upon information. The LP uses this information from the LD, and vice versa, to determine the security to be used during normal operation or the characteristics of the other device.

A device with this feature exhibits different properties of operation depending on the device at the other end. These properties could range from not permitting a connection to occur between the devices to a measurable performance differentiation. This exchange, if occurring between two equally equipped devices, also permits the exchange of in-band management information that would not occur in devices not equally equipped. In-band management would permit features such as provisioning and fail-over switching.

Figure 5A:
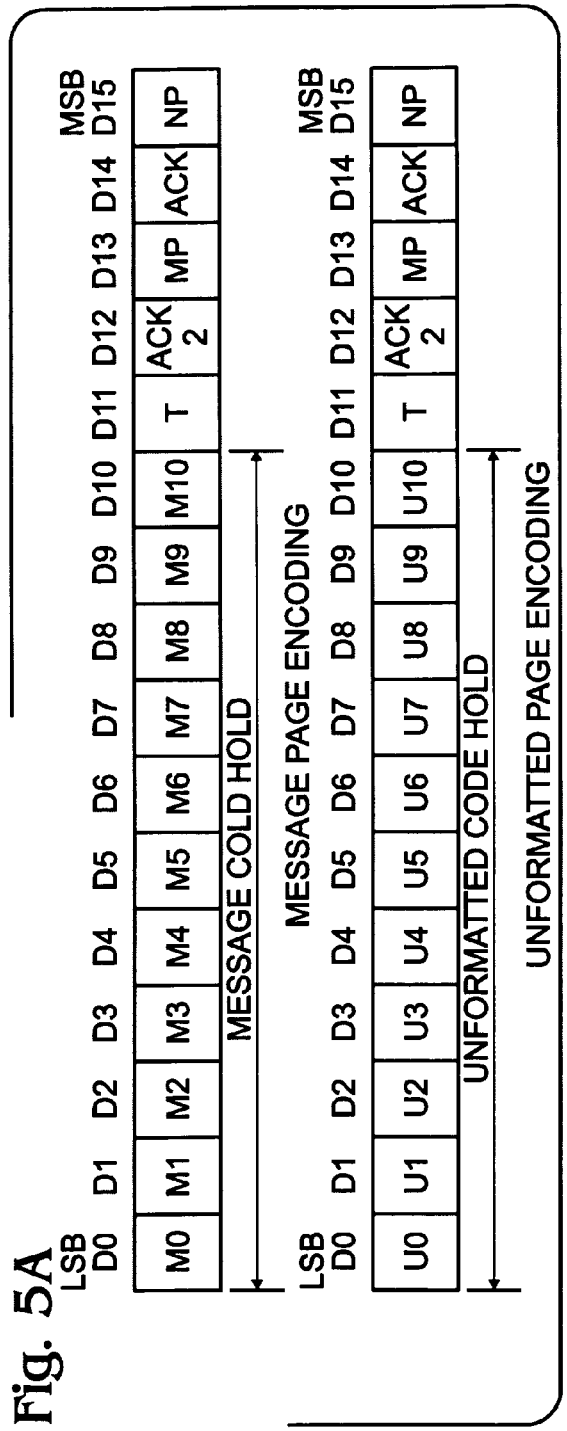
FIGS. 5A through 5C are diagrams illustrating auto-negotiation Next Pages.
Figure 5B:
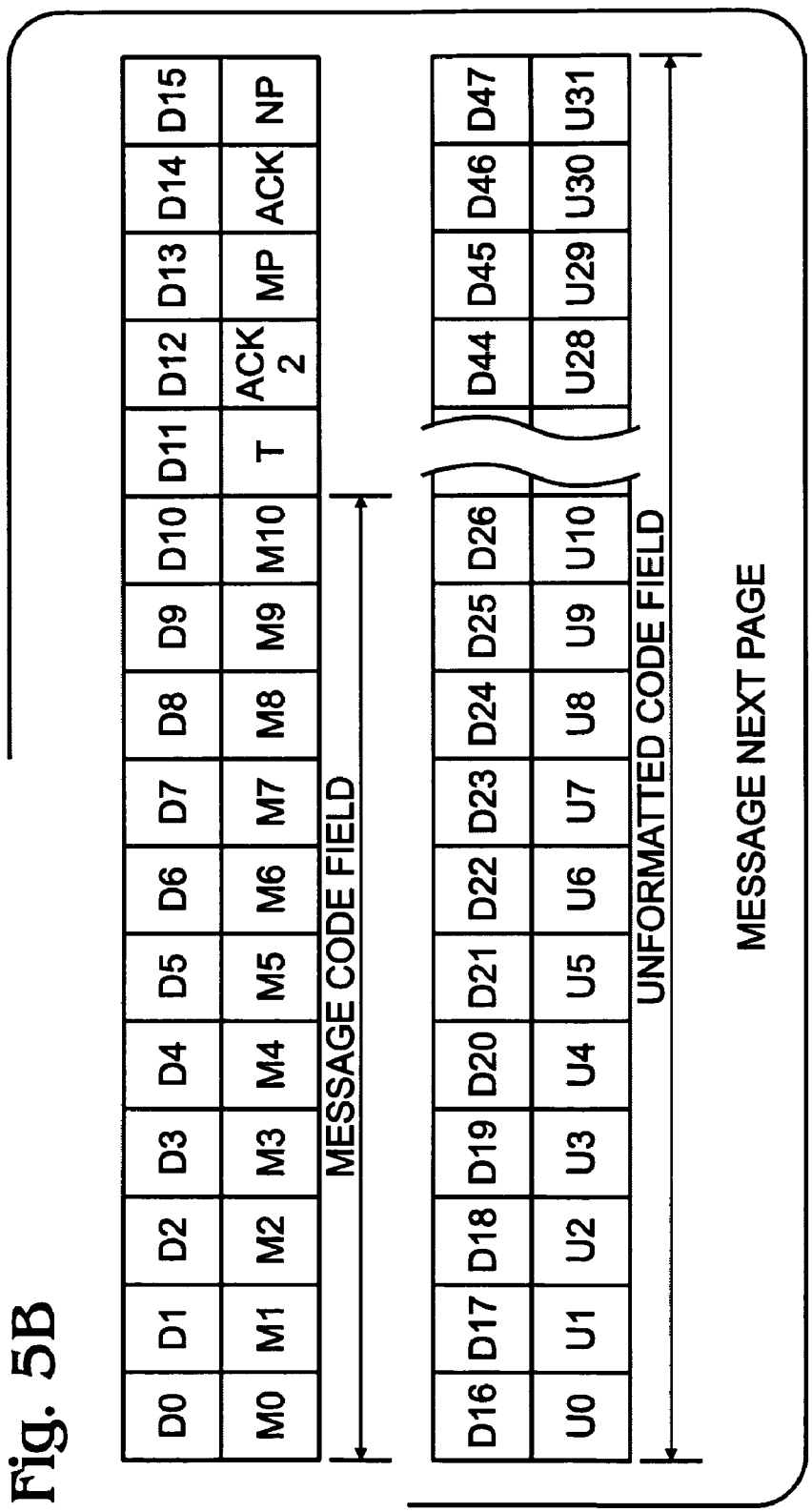
Figure 5C:
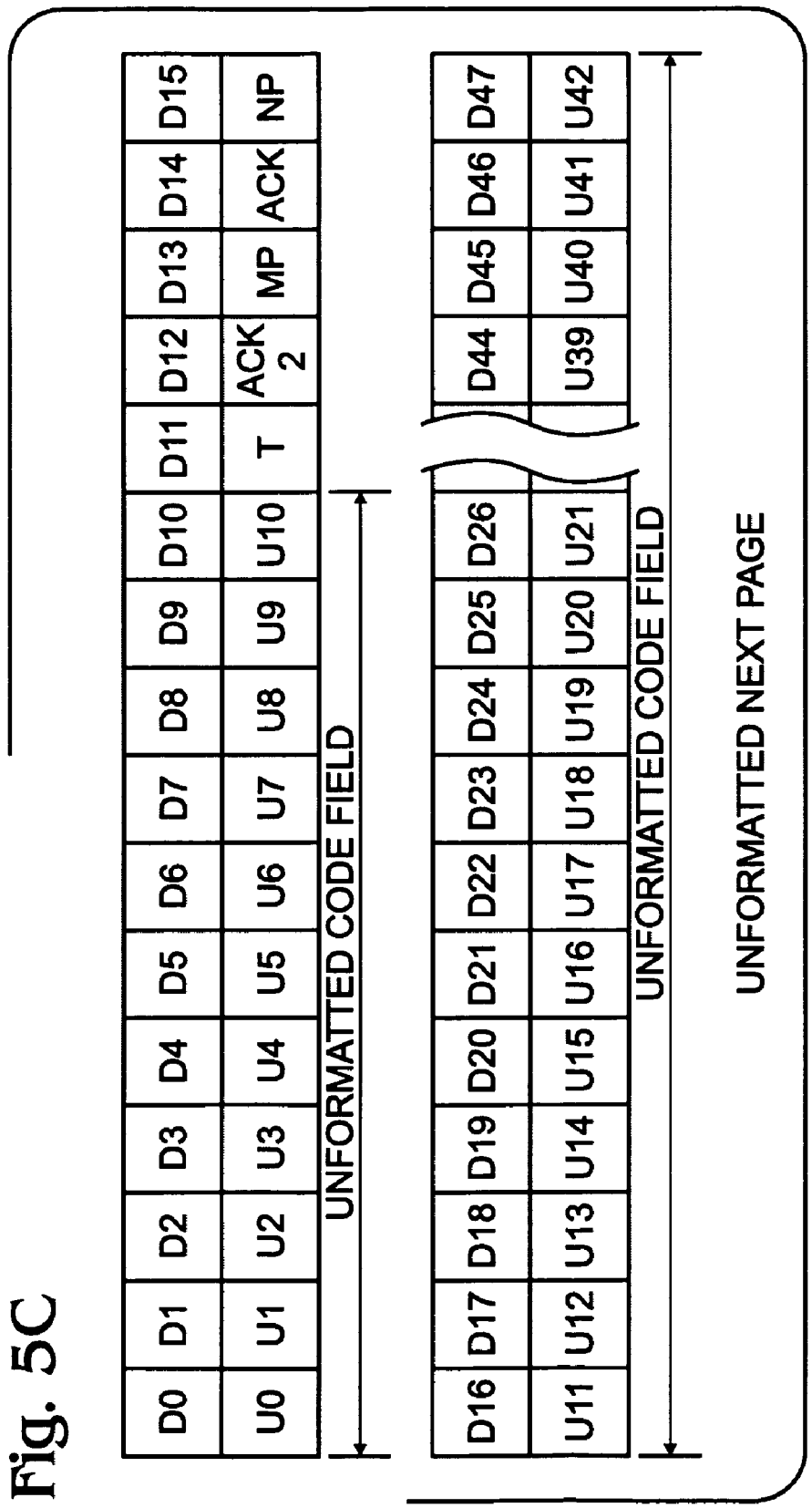

FIGS. 5A through 5C are diagrams illustrating auto-negotiation Next Pages. All auto-negotiation processes include Next Page (NP) capabilities. IEEE 802.3 documents specific uses of certain NPs required to establish a link. There is a Message Page coding and an Unformatted Page coding. The original NP format is shown in FIG. 5A. A new extended NP format is shown in FIGS. 5B and 5C. The invention can be enabled using the formats depicted in FIGS. 5B and 5C.

Auto-negotiation (AN) starts by exchanging base page information. After base pages are exchanged and if required, NPs are exchanged to further establish link parameters. Upon completion of link parameter exchange, the NP exchange can be extended to communicate other relevant information. The present invention extends the NP exchange to initiate transfer of important low-level security or ID information.

The specific security protocol may be based upon one of the following examples. A security key may be exchanged between link partners. Vendor specific information may be used as security information, or ID information may be exchanged. Encoded messages exchanges may be used to verify link partner. The security protocol detects intrusion, establishes security capabilities between devices, and denies the link to unsecured devices. The security protocol monitors auto-negotiation transactions, and denies service or the exchange of security settings if incorrect responses are detected.

Figure 6:
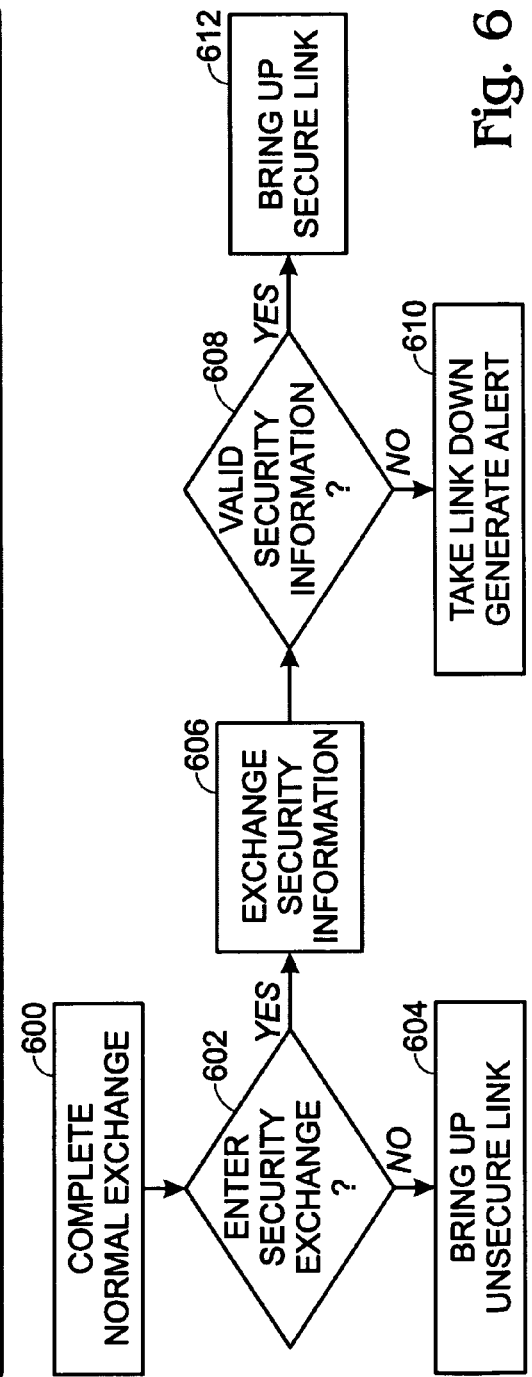
FIG. 6 is a flowchart illustrating an example of establishing a secure link.

FIG. 6 is a flowchart illustrating an example of establishing a secure link. A conventional AN NP process completes in Step 600. In Step 602 a decision is made to enter into a secure exchange. If security information is not to be exchanged, Step 604 alerts a management entity to the use of an unsecured link. In Step 606 security information is exchanged. If invalid security information is detected in Step 608, then Step 610 halts the link and the management entity would be alerted. Otherwise, if security exchange is successful, the management entity receives an indication of a secure link in Step 612. The operations in Steps 600 through 612 complete before any data packet is exchanged.

FIG. 7 is a flowchart illustrating a method for securing links at the PHY layer in an IEEE 802.3 Ethernet communication system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Prior to agreeing to communicate NP messages, in Step 701 the LD exchanges electrical waveforms representing base page messages with the LP. Prior to receiving LP security information, in Step 702 the LD transmits an electrical waveform representing an agreement to communicate NP messages with the LP. In Step 704 the LD transmits an electrical waveform representing an agreement to communicate unformatted message pages with the LP. In Step 706 an LD receives an electrical waveform representing link partner security information from a network-connected LP via unformatted message pages. Step 708 accesses predetermined LP reference information stored in a tangible memory medium. In Step 710 the LD compares the received LP security information to the LP reference information. In response to the LD matching the received LP security information to the LP reference information, Step 712 verifies a secure link to the LP. In response to the LP failing to agree to exchange security information with the LD, in Step 713a the LD establishes an unsecured link with the LP. Alternately, in response to unsuccessfully matching the LP security information to the LP reference information, in Step 713b, the LD takes down the link or generates an alert.

In Step 714 the LD sends security information to the LP via the unformatted message pages. In Step 716 the LP accesses predetermined LD reference information in a tangible memory medium. In Step 718 the LP compares the LD security information to the LD reference information. In response to the LP matching the LD security information to the LD reference information, Step 720 verifies a secure link to the LD. Note: Steps 714 through 720 may be enacted concurrently with Steps 706 though 712.

In one aspect, receiving security information from the LP via the unformatted message pages in Step 706 includes the LD receiving information such as a proprietary code or device identification. For example, the LD may receive a predetermined bit sequence in a first unformatted message page, and then receive a key in subsequent unformatted message pages. Then, comparing LP security information to the LP reference information in Step 710 includes the LD generating a code using the key, and comparing the code to the LP reference information.

In another aspect, agreeing to communicate NP messages with the LP in Step 702 includes the LD sending an electrical waveform representing an unformatted message page indicating that a secure link is required. Then, the LP responds with an electrical waveform representing an unformatted message page acknowledging the initiation of a secure link procedure. For example, the sending of the unformatted message page indicating that the secure link is required includes the LD sending an unformatted message page with an MP bit set to a logic zero. Then, the response to the unformatted message page acknowledging the initiation of the secure link procedure includes the LP sending an unformatted message page with the MP bit set to a logic zero.

A system and method for securing a communication link at the PHY layer has been provided. Examples, of particular circuitry and process flows have been given to illustrate the invention. However, the invention is not limited to merely these examples. Likewise, examples have been given in the context of an Ethernet protocol and particular data rates. Again the invention is not limited to these examples. Other variations and embodiments of the invention will occur to those skilled in the art.

I claim:

1. In an IEEE 802.3 Ethernet communication system, a method for securing links at the physical (PHY) layer, the method comprising:

a local device (LD) transmitting an electrical waveform representing an agreement to communicate IEEE 802.3 protocol Next Page (NP) messages with a network-connected link partner (LP);

the LD transmitting an electrical waveform representing unformatted pages to the LP, indicating that a secure link is required;

the LD receiving an unformatted page response from the LP, acknowledging the initiation of a secure link procedure;

the LD receiving an electrical waveform representing link partner security information from the unformatted pages;

the LD accessing predetermined LP reference information stored in a tangible hardware memory;

the LD comparing the received LP security information to the LP reference information; and, in response to the LD matching the received LP security information to the LP reference information, verifying a secure link to the LP.

2. The method of claim 1 further comprising:

the LD sending security information to the LP via the unformatted pages;

the LP accessing predetermined LD reference information in a tangible hardware memory;

the LP comparing the LD security information to the LD reference information; and, in response to the LP matching the LD security information to the LD reference information, verifying a secure link to the LD.

3. The method of claim 1 wherein receiving security information from the LP via the unformatted pages includes the LD receiving information selected from a group consisting of a proprietary code and a device identification.

4. The method of claim 3 wherein the LD receives the proprietary code as follows:

the LD receiving a predetermined bit sequence in a first unformatted message page;

the LD receiving a key in subsequent unformatted pages;

wherein comparing LP security information to the LP reference information includes the LD:

generating a code using the key; and, comparing the code to the LP reference information.

5. The method of claim 1 wherein sending the unformatted page indicating that the secure link is required includes the LD and sending and unformatted page with an MP bit set to a logic zero; and, wherein responding with the unformatted page acknowledging the initiation of the secure link procedure includes the LP sending an unformatted page with the MP bit set to a logic zero.

6. The method of claim 1 further comprising: prior to agreeing to communicate NP messages, the LD exchanging electrical waveforms representing base page messages with the LP.

7. The method of claim 1 further comprising:
in response to the LP failing to agree to exchange security information with the LD, the LD establishing an unsecured link with the LP.

8. The method of claim 1 further comprising:
in response to unsuccessfully matching the LP security information to the LP reference information, the LD taking an action selected from a group consisting of taking down the link and generating an alert.

9. In an IEEE 802.3 Ethernet communication network, a system for securing links at the physical (PHY) layer, the system comprising:
a local device (LD), the LD including:
a memory having stored therein predetermined link partner (LP) reference information;
a network interface for receiving security information from a network-connected LP via IEEE 802.3 protocol unformatted pages;
a security module having an interface for accepting the LP security information and accessing the LP reference information stored in memory, the security module comparing the LP security information to the LP reference information, and supplying a secure link signal in response to matching the LP security information to the LP reference information; and,
wherein the LD security module agrees to communicate NP messages with the LP by sending an unformatted page via the network interface indicating that a secure link is required, and receiving an unformatted page from the LP acknowledging the initiation of a secure link procedure.

10. The system of claim 9 wherein the LD security module sends security information to the LP via the network interface using unformatted pages;
the system further comprising: an LP, LP including:
a memory having stored therein predetermined LD reference information;
a network interface for receiving security information from the network-connected LD via unformatted pages;
a security module having an interface for accepting the LD security information and accessing the LD reference information stored in memory, the security module comparing the LD security information to the LD reference information, and supplying a secure link signal in response to matching the LD security information to the LD reference information.

11. The system of claim 9 wherein the LD security module receives LP security information, via the network interface, selected from a group consisting of a proprietary code and a device identification.

12. The system of claim 11 wherein the LD security module receives a proprietary code as a predetermined bit sequence in a first unformatted page, and receives a key in subsequent unformatted pages, the LD security module comparing LP security information to LP reference information by generating a code using the key, and comparing the code to the LP reference information.

13. The system of claim 9 wherein the LD security module sends an unformatted page with an MP bit set to a logic zero, and receives an unformatted page with the MP bit set to a logic zero.

14. The system of claim 9 wherein the LD security module exchanges base page messages with the LP via the network interface, prior to agreeing to communicate NP messages.

15. The system of claim 9 wherein the LD security module supplies a signal indicating the establishment of an unsecured link with the LP in response to the LP failing to agree to exchange security information with the LD.

16. The system of claim 9 where the LD security module takes an action selected from a group consisting of taking down the link and generating an alert, in response to unsuccessfully matching the LP security information to the LP reference information.

* * * * *